United States Patent
Dolle

(10) Patent No.: US 9,013,291 B2
(45) Date of Patent: Apr. 21, 2015

(54) INSTRUMENT PANEL AND METHOD FOR DISPLAYING A FIRST SYMBOL AND A SECOND SYMBOL

(76) Inventor: Christophe Dolle, Osny (FR)

( * ) Notice: Subject to any disclaimer, the term of this patent is extended or adjusted under 35 U.S.C. 154(b) by 329 days.

(21) Appl. No.: 12/738,562

(22) PCT Filed: Oct. 17, 2008

(86) PCT No.: PCT/EP2008/008825
§ 371 (c)(1), (2), (4) Date: Jul. 14, 2010

(87) PCT Pub. No.: WO2009/049902
PCT Pub. Date: Apr. 23, 2009

(65) Prior Publication Data
US 2010/0277299 A1   Nov. 4, 2010

(30) Foreign Application Priority Data
Oct. 19, 2007   (DE) .......................... 10 2007 050 543

(51) Int. Cl.
*B60Q 1/00*   (2006.01)
*B60K 37/02*  (2006.01)
*G09G 5/00*   (2006.01)
*G05D 1/00*   (2006.01)

(52) U.S. Cl.
CPC ......... B60K 37/02 (2013.01); *B60K 2350/1072* (2013.01)

(58) Field of Classification Search
USPC ....................................................... 340/461
See application file for complete search history.

(56) References Cited

U.S. PATENT DOCUMENTS

| 6,721,634 | B1  |   | 4/2004  | Hauler et al. |
| 2001/0012976 | A1 | * | 8/2001 | Menig et al. ..................... 701/1 |
| 2002/0149495 | A1 | * | 10/2002 | Schach et al. ............ 340/815.78 |
| 2005/0030256 | A1 | * | 2/2005 | Tubidis et al. .................. 345/30 |
| 2005/0168330 | A1 | * | 8/2005 | Ono et al. ..................... 340/461 |
| 2006/0181399 | A1 | * | 8/2006 | Sumiya ........................ 340/461 |
| 2007/0171087 | A1 | * | 7/2007 | Shimazu et al. ............. 340/679 |
| 2008/0284678 | A1 | * | 11/2008 | Randel et al. .................. 345/55 |

FOREIGN PATENT DOCUMENTS

| DE | 10018336 A1 | 11/2000 |
| DE | 10352933 A1 | 6/2005 |
| DE | 102005035481 A1 | 2/2007 |
| DE | 19507997 B4 | 7/2007 |
| FR | 2791620 A1 | 10/2000 |
| GB | 2351052 A * | 12/2000 ............. B60K 35/00 |

OTHER PUBLICATIONS

International Search Report for application No. PCT/EP2008/008825 mailed Oct. 2, 2009.
Chinese Office Action dated Apr. 16, 2013.

* cited by examiner

*Primary Examiner* — Jack K Wang
(74) *Attorney, Agent, or Firm* — Fletcher Yoder, P.C.

(57) ABSTRACT

An automobile instrument panel includes display means with a display area. First and second symbols may be displayed in the display area to convey safety information. The duration of display of a symbol may be different depending upon whether it is an acute safety symbol or a normal safety symbol. An audible alarm may also be activated.

6 Claims, 1 Drawing Sheet

INSTRUMENT PANEL AND METHOD FOR DISPLAYING A FIRST SYMBOL AND A SECOND SYMBOL

CROSS REFERENCE TO RELATED APPLICATIONS

This application claims priority from and the benefit of PCT Application No. PCT/EP2008/008825, filed on Oct. 17, 2008 and German Patent DE 10 2007 050 543.6, filed on Oct. 19, 2007; both entitled "Instrument Panel and Method for Displaying a First Symbol and a Second Symbol", which are herein incorporated by reference.

BACKGROUND

The present invention relates on the one hand to an instrument panel, notably for an automobile, and on the other hand to a method for displaying a first symbol and a second symbol.

It is now commonplace to display alert or safety symbols on a display area of an instrument panel so as to inform a user of a vehicle of a state of emergency relating to a quantity such as the temperature or the pressure of the oil in a combustion engine or else the temperature of the coolant or else an error state in a system like the antilock braking system (ABS) or the electronic path corrector (electronic stability program (ESP)). It is known, to implement the possibility of informing the user of the vehicle so as to provide, for each symbol to be displayed, a particular portion of a display area. By such an implementation, the various symbols are displayed separated from one another on the display area, notably on a display area of an instrument panel. Consequently, this implementation requires a relatively large display area devoted to the display of a certain number of different symbols. This is despite the fact that the total display area in an instrument panel remains relatively limited. Furthermore, because there is a different place for different alert or safety symbols, the information displayed on the instrument panel is less clearly presented.

From the documents DE 195 07 997 B4 and DE 10 2005 035 481 A1, it is also known to provide a display device for alert or safety symbols in a vehicle. In these documents, it is planned to reserve at least a portion of a display area exclusively for the display of a single symbol which reduces the display area intended for the display of other information and, in addition, the information displayed on the instrument panel is less clearly presented.

SUMMARY

The aim of the present invention is notably to overcome the drawbacks of the prior art, and notably those cited hereinabove, and also propose an instrument panel so as to minimize the area not used for most of the time for displaying different alert or safety symbols on the one hand and on the other hand to provide a presentation of the displayed information that is as clear as possible.

According to the invention, this aim is achieved by an automobile instrument panel comprising at least one display means, the display means having a display area, the display means being intended to display a first symbol in the display area and being intended to display a second symbol in the display area, the first symbol and the second symbol being symbols associated with safety information.

By virtue of such an implementation of the instrument panel, a very clear presentation of the displayed information is possible. This makes it possible to increase the safety level of a vehicle equipped with such an instrument panel because the user can concentrate on the important information and is not distracted from the main information by a multitude of presented information and/or by different places for the information. Furthermore, the total display area can be reduced which renders the inventive instrument panel less costly, or else the display area devoted to the representation of different alert or safety symbols can be reduced in favor of a larger representation of other information to be displayed. Provision is made to display the first symbol and the second symbol in the display area, that is to say in the same display area of the instrument panel. This means that the first symbol and the second symbol cannot be displayed (for example overlaid on one another) at the same time.

A preferred refinement of the invention lies in the fact that the display area being the only place of display for the first symbol and the second symbol.

By virtue of such an instrumentation of the inventive instrument panel, it is advantageously possible to minimize the display area needed to view the content of information to be transmitted to a user, notably the driver, of the vehicle. There can be a series of two or three or more than three symbols.

According to a preferred embodiment of the instrument panel according to present invention, the display means is a display means of matrix or pseudo-matrix type.

By virtue of such an implementation of the inventive instrument panel, it is advantageously possible to provide a very flexible display in the display area so as to be able to display a multitude of different symbols (sizes, colors, etc.).

A preferred refinement of the invention lies in the fact that the instrument panel comprises an acoustic actuation means, the acoustic actuation means being intended to be activated when the first symbol or the second symbol is displayed in the display area.

By virtue of such an implementation of the inventive instrument panel, it is advantageously possible to inform the user of the vehicle differently regarding an emergency state or a reduced safety state.

The present invention also relates to a method of displaying a first symbol and a second symbol in a display area of an instrument panel, notably as claimed in any one of the preceding claims, the first symbol being displayed for a first time interval in the display area and in that the second symbol is displayed in the display area for a second time interval. According to the present invention, it is also advantageously possible to indicate different symbols differently, for example through a repetition and/or a display time and/or a different blinking mode, notably according to the alert.

By virtue of such an implementation of the display method, it is advantageously possible to increase the safety level of a vehicle because the user can concentrate on the important information and is not distracted from the main information by a multitude of presented information and/or by different places for the information.

A preferred refinement of the invention lies in the fact that the first time interval is of a first duration when the first symbol is an acute safety symbol and in that the first time interval is of a second duration when the first symbol is a normal safety symbol.

By virtue of such an implementation of the display method, it is advantageously possible to produce a flexible display in different alert or safety situations that is reduced.

According to a preferred refinement of the display method according to the present invention, the acoustic actuation means is activated in a first manner when the first symbol is an acute safety symbol and in that the acoustic actuation means is activated in a second manner when the first symbol is a normal safety symbol.

A preferred refinement of the invention lies in the fact that the display and/or the backlighting of the first symbol is activated in a first manner when the first symbol is an acute safety symbol and in that the display and/or the backlighting of the first symbol is activated in a second manner when the first symbol is a normal safety symbol.

Other features and benefits of the invention will emerge from reading the following description of a particular non-limiting embodiment of the invention.

DRAWINGS

The invention will be better understood from the following description, which relates to preferred embodiments, given as nonlimiting examples, and explained with reference to the appended diagrammatic drawings, in which.

DETAILED DESCRIPTION

Figure 1:
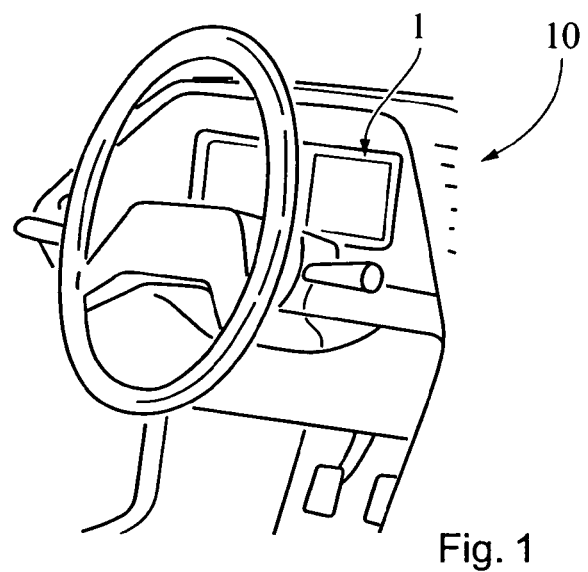
FIG. 1 is a diagrammatic perspective view on an instrument panel according to the present invention.

FIG. 1 in the appended drawings shows a diagrammatic perspective view on an instrument panel 10 according to the present invention. The instrument panel 10 comprises a display means 1.

Figure 2:
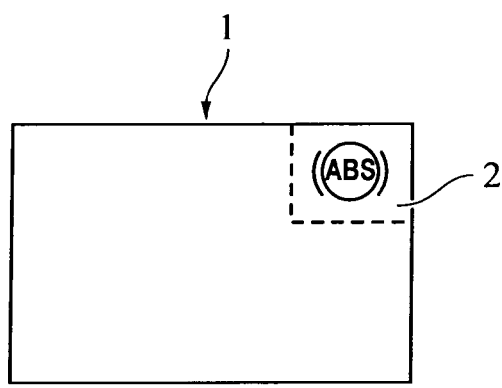
FIG. 2 is a diagrammatic view of a display device.

FIG. 2 of the appended drawings shows a diagrammatic view of a display means 1 for an instrument panel 10 according to the present invention. The display means 1 comprises a display area 2 in which it is possible to display a number of symbols on the same display area 2. As an example, a symbol concerning the antilock braking system (ABS) is represented. For example, the display of this symbol may indicate that the state of the antilock braking system is not entirely satisfactory and/or the safety level associated with this system is reduced.

Figure 3:
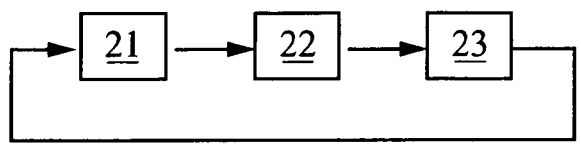
FIG. 3 is a diagrammatic view on a diagram representing the changing display for a number of symbols.

FIG. 3 in the appended drawings shows a diagrammatic view on a diagram representing the changing display for a number of symbols, for example a first symbol 21, a second symbol 22 and a third symbol. The symbols 21, 22, 23 are, for example, displayed alternately, that is to say the first symbol 21 is displayed for a first time interval, then the second symbol 22 is displayed for a second time interval, then the third symbol 23 is displayed for a third time interval, and then, the first symbol 21 is once again displayed (notably for the first time interval). By such an alternating display, it is possible to increase the size of the representation of the symbols 21, 22, 23, thus increasing the visibility and clarity of the information displayed on the inventive instrument panel 10. The first, second and third time intervals may be of the same duration or may be of different durations. Notably, the duration of the time intervals may vary according to the level of urgency with which the corresponding symbol is associated. For example, a symbol representing very urgent information may be displayed longer (in time) compared to a symbol representing safety information but with a lower level of urgency. The different levels of urgency can also be viewed or communicated to the driver of the vehicle through other information transmission means, notably through the display on the display area 2 and an audible signal or else through a different mode of display on the display area 2, for example through a different color or through the presence or absence of a back-lighting of the symbol displayed or else through the activation of a light element, notably a light-emitting diode (LED). The audible signal may be produced by an acoustic actuation means (not shown in the drawings).

If the state of the vehicle requires only the display of a single alert or safety symbol, this symbol is permanently displayed and no alternating display is used.

The symbols 21, 22, 23 may consist of one or more graphic symbols and/or one or more numerals and/or one or more letters or a text. For example, the display means 1 is implemented by a liquid crystal element. The symbols 21, 22, 23 may notably be presented when starting up the engine of the vehicle.

The invention claimed is:

1. A method of displaying a first symbol and a second symbol in a display area of an instrument panel for an automobile, comprising:
    displaying a first symbol for a first time interval in the display area, wherein the first time interval is based on a first degree of importance of the first symbol; and
    displaying a second symbol in the display area for a second time interval, wherein the second time interval is based on a second degree of importance of the second symbol;
    wherein the first symbol and the second symbol are each associated with safety information, the display area corresponds to a portion of a display, the display area is configured to display only one symbol at a given time, the display area is the only place of display for the first symbol and the second symbol, the first symbol and the second symbol are displayed in an alternating pattern such that only one symbol is displayed at a given time, the first degree of importance is of a high degree of importance, the second degree of importance is of a low degree of importance, and the first time interval is greater than the second time interval.

2. The display method as claimed in claim 1, comprising activating an acoustic actuation device in a first manner upon displaying the first symbol, activating the acoustic actuation device in a second manner, different than the first manner, upon displaying the second symbol, or a combination thereof.

3. The display method as claimed in claim 1, comprising activating back-lighting of the first symbol in a first manner, activating back-lighting of the second symbol in a second manner, different than the first manner, or a combination thereof.

4. A method of displaying a first symbol and a second symbol in a display area of a matrix display or a pseudo-matrix display within an automobile, comprising:
    displaying a first symbol for a first time interval in the display area, wherein the first time interval is based on a first degree of importance of the first symbol; and
    displaying a second symbol in the display area for a second time interval, wherein the second time interval is based on a second degree of importance of the second symbol;
    wherein the first symbol and the second symbol are each associated with safety information, the display area corresponds to a portion of the matrix display or the pseudo-matrix display, the display area is configured to display only one symbol at a given time, the display area is the only place of display for the first symbol and the second symbol, the first symbol and the second symbol are displayed in an alternating pattern such that only one symbol is displayed at a given time, the first degree of importance is of a high degree of importance, the second degree of importance is of a low degree of importance, and the first time interval is greater than the second time interval.

5. The display method as claimed in claim 4, comprising activating an acoustic actuation device in a first manner upon displaying the first symbol, activating the acoustic actuation device in a second manner, different than the first manner, upon displaying the second symbol, or a combination thereof.

6. The display method as claimed in claim 4, comprising activating back-lighting of the first symbol in a first manner, activating back-lighting of the second symbol in a second manner, different than the first manner, or a combination thereof.

* * * * *